US005239005A

United States Patent [19]

Lee

[11] Patent Number: 5,239,005

[45] Date of Patent: Aug. 24, 1993

[54] THERMAL AGING RESISTANT POLYMER ALLOYS OF POLYCYCLOOLEF-IN POLYMERS

[75] Inventor: Biing-Lin Lee, Broadview Heights, Ohio

[73] Assignee: The B.F. Goodrich Company, Akron, Ohio

[21] Appl. No.: 983,105

[22] Filed: Nov. 24, 1992

Related U.S. Application Data

[63] Continuation of Ser. No. 22,300, Mar. 5, 1987, abandoned.

[51] Int. Cl.[5] .............................................. C08L 45/00
[52] U.S. Cl. .................................... 525/210; 525/211
[58] Field of Search ............................... 525/210, 211

[56] References Cited

FOREIGN PATENT DOCUMENTS 0107079 11/1984 European Pat. Off. .
0107081 11/1984 European Pat. Off. .

*Primary Examiner*—James J. Seidleck
*Assistant Examiner*—I. Zemel
*Attorney, Agent, or Firm*—Hudak & Shunk Co.

[57] ABSTRACT

Alloys of polycycloolefin polymers are produced by melt blending the same with ethylene-based functional polymers. The polycycloolefin polymer can be a homopolymer, an interpolymer, or blends thereof. The alloys of the present invention have improved properties such as impact strength, solvent resistance, and melt viscosity reduction, as well as improved thermal aging properties such as retention of impact strength and melt viscosity.

13 Claims, No Drawings

THERMAL AGING RESISTANT POLYMER ALLOYS OF POLYCYCLOOLEF-IN POLYMERS

This application is a continuation of application Ser. No. 07/022,300, filed on Mar. 5, 1987, of Biing-lin Lee, for "Thermal Aging Resistant Polymer Alloys of Polycycloolefin Polymers", now abandoned.

FIELD OF THE INVENTION

The present invention relates to blends containing a major amount of a polycycloolefin polymer and a minor amount of an ethylene-based functional polymer. More specifically, the present invention relates to minimizing the deterioration of environmental thermal aging properties which have been a drawback of polycycloolefin polymers.

BACKGROUND

Heretofore, polycycloolefin polymers and methods for their preparation have been described in U.S. Pat. Nos. 4,002,815; 4,069,376; 4,110,528; 4,262,103; 4,380,617; all assigned to BFGoodrich (Robert J. Minchak and co-workers).

U.S. Pat. No. 4,400,340 to Klosiewicz relates to a process for preparing a polydicyclopentadiene in the absence of a diluent and conducting the polymerization reaction in a mold.

U.S. Pat. No. 4,418,179 to Dewitt, Minchak, Lee, and Benedilkt relates to impact modified polycycloolefins in which polyolefin powders such as polyethylene are dispersed in the cycloolefin monomer and then polymerized to obtain polycycloolefin polymer blends.

SUMMARY OF THE INVENTION

It is therefore an aspect of the present invention to provide a polymer alloy made by melt blending polycycloolefin polymers with minor amounts of ethylene-based functional polymers. An improvement in physical properties as well as retention of thermal stability properties is obtained.

DETAILED DESCRIPTION OF THE INVENTION

Polycycloolefin polymers utilized in the present invention are known to the art as well as to the literature. They are made from various cycloolefin monomers as set forth hereinbelow and exist, as a homopolymer; an interpolymer, e.g. a copolymer, a terpolymer, etc.; or mixtures thereof, in physical association, that is an alloy or blend, with an ethylene-based functional polymer.

By the term "ethylene-based functional polymer" it is meant a copolymer or desirably a blend of two or more copolymers (e.g. a primary or a secondary) of ethylene and at least one other monomer containing functional groups thereon. Considering the copolymer, the functional monomer utilized in making the ethylene-based copolymer (e.g. the primary copolymer) can be a vinyl ester having a total of from 1 to about 10 carbon atoms with acetate being preferred. The amount of the vinyl ester component of the ethylene-based functional copolymer is from about 5% to about 50% by weight and desirably from about 10% to about 35% by weight.

The ethylene-vinyl ester copolymers are desirably utilized in a primary amount with a minority amount of another (i.e. a secondary) ethylene-based vinyl and functional containing copolymer. The additional monomers of the second copolymer which contain at least one functional group are usually vinyl organic acids or organic anhydrides. For example, the additional functional comonomers can be acrylic acid, methacrylic acid, and various hydrocarbon derivatives thereof as well as maleic anhydride, or various derivatives thereof, wherein said acids and said anhydrides have a total of from 3 to 12 carbon atoms. Methacrylic acid is a preferred comonomer. The additional vinyl and functional monomer of the secondary copolymer generally exists in a small amount as from about 1% to about 25% by weight based upon the total weight of the secondary copolymer. When utilized, the amount of the secondary copolymer is from about 0% or 1% to about 50% by weight and desirably from about 5% to about 40% by weight. Thus, the amount of the primary ethylene-based functional copolymer exists in an amount of from about 50% to about 100% by weight and preferably from about 60% to about 95% by weight.

Other types of ethylene-based functional copolymers or copolymers are set forth in U.S. Pat. No. 4,230,830 which is hereby fully incorporated by reference. This patent relates to a polymer blend comprising or consisting essentially of:

a. about from 80%–99% by weight of a first olefinic polymer selected from
   (i) non-polar ethylene polymers and copolymers having a density of about from 0.930 to 0.965 g/cc, and
   (ii) copolymers of ethylene having up to about 30 weight percent of at least one ethylenically unsaturated ester having from 4 to 12 carbon atoms; and
b. about from 1%–19% of a second olefinic polymer selected from the group consisting of
   (i) non polar ethylene polymers and copolymers having a density of about from 0.945 to 0.965 g/cc, and
   (ii) terpolymers of ethylene, at least one alpha-olefin having from 3–6 carbon atoms, and at least one nonconjugated diene; the second olefinic polymer being thermally grafted with an unsaturated acid or anhydride to give a copolymer having about from 0.02 to 4.0 weight percent of grafted succinic groups, provided, however, that when the second olefinic polymer is (ii); then the first olefinic polymer is (ii).

Regardless of whether or not a second or a third, etc. ethylene-based functional copolymer is utilized, the melt index of the overall ethylene-based functional polymer, that is an ethylene-vinyl ester copolymer or blends thereof, is from about 2 to 40 g/10 min and desirably from about 6 to about 35 g/10 min. The density is from about 0.92 to about 1.1 g/cc and desirably from about 0.92 to about 0.96 g/cc. The ethylene-based functional polymer or blends thereof useful in the present invention are available from DuPont under the name Bynel CXA resins such as CXA resin 1123, resin 1124, or resin 3101. A specific example of a suitable ethylene-based functional polymer is a blend of 92.5% by weight of a primary ethylene-vinyl acetate copolymer containing 28% by weight of vinyl acetate therein and 7.5% by weight of a secondary ethylene-methacrylic acid copolymer containing 15% by weight of methacrylic acid therein.

The amount of the ethylene-based functional polymer is generally a minor amount of the polycycloolefin polymer alloy of the present invention, that is from about 10% to about 45% by weight, desirably from about 12% to about 35% by weight, and preferably from about 15% to about 25% by weight based upon the total weight of the ethylene-based functional polymer, (including blends of ethylene and at least one other monomer containing functional group thereon), and the polycycloolefin polymer. Amounts below 10% by weight tend to be ineffective whereas amounts in excess of 45% by weight tend to unduly increase flexibility.

The polycycloolefin monomers of the present invention include monocycloolefin monomers and/or polycycloolefin monomers. The monocycloolefin monomers include monoolefins as well as diolefins containing from 4 to 14 carbon atoms, and preferably from 4 to 9 carbon atoms with specific examples including cyclobutene, cyclopentene, cycloheptene, cyclooctene, 1,5-cyclooctadiene, and the like. Of the various monocyclic olefin monomers, cyclopentene, cyclooctene and 1,5-cyclooctadiene are generally preferred. Since the invention relates to the production of polycycloolefin polymers, the monocycloolefin monomers must be utilized in association with at least one polycycloolefin monomer.

The polycycloolefin monomers contain from 2 to 10 rings and preferably from 2 to 4 rings. The polycycloolefins utilized as monomers generally contain from 7 to 35 carbon atoms and from 1 to 4 double bonds, and more preferably from about 7 to about 13 carbon atoms and 1 or 2 double bonds. Specific examples of monomers which can be utilized to make homopolymers or interpolymers include norbornene, methylnorbornene, tetracyclododecene, methyltetracyclododecene, dimethyldicyclopentadiene, ethylnorbornene, propylnorobornene, butylnorbornene, phenylnorbornene, and cyclonexenylnorbornene. Specific examples of polycycloolefin monomers which desirably should be utilized in association with other monomers, that is to form an interpolymer, include cyclopentadiene trimer, vinylnorbornene, and ethylidenenorbornene. Preferred polycycloolefin monomers include dicyclopentadiene norbornene, methylnorbornene, ethylnorbornene, propylnorbornene, phenylnorbornene, and cyclohexenylnorbornene.

Various other monomers exist and are generally made by reacting a norbornene type monomer having the formula as set forth hereinbelow with various other monocycloolefins or polycycloolefins set forth above, as known to the art and to the literature. The norbornene formula is generally as follows:

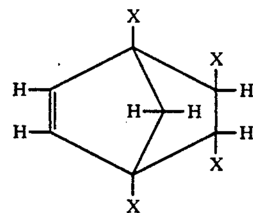

wherein X is hydrogen or an alkyl having from 1 to 6 carbon atoms and more desirably from 1 to 3 carbon atoms. Examples of specific norbornene-type monomers include 2-norbornene, 5-methyl-2-norbornene, 5-ethyl-2-norbornene, 5-phenyl-2-norbornene, and the like. Generally, 2-norbornene and 5-methyl-2-norbornene are preferred. Naturally, homopolymers can be made from the above-noted monomers.

Examples of suitable copolymers of the present invention include those made from norbornene and or methyl norbornene with either methyltetracyclododecene, or tetracyclododecene, or dicyclopentadiene. Examples of suitable terpolymers of the present invention include those made from dicyclopentadiene, methylnorbornene, and methyltetracyclododecene monomers; methylnorbornene, norbornene, and methyltetracyclododecene monomers; and methylnorbornene, phenylnorbornene, and tetracyclododecene monomers.

Preferred polycloolefin polymers of the present invention include those made from dicyclopentadiene, methylnorbornene and methyltetracyclododecene monomers; methylnorbornene, norbornene, and methyltetracyclododecene monomers; and methylnorbornene, ethylidenenorbornene, and methyltetracyclododecene monomers.

The polycycloolefin polymers can have a glass transition temperature, Tg, of from about 0° C. to about 250° C. desirably from about 45° C. to about 180° C. and preferably from about 75° C. to about 160° C. However, a plastic compound, that is a polycycloolefin polymer having a Tg of 45° C. or greater are desired. Excessively high Tg's are not desired in that high mixing temperatures or blending temperatures are required which result in loss of the functionality of the polycycloolefin vinyl group. That is, an alkyl group is formed.

The polycycloolefin polymers of the present invention are blended with the ethylene-based functional polymers of the present invention at temperatures above the glass transition temperatures of the polycycloolefin polymers. Generally, the melt processing temperatures are from about 5° C. to about 150° C., and desirably from about 20° C. to about 100° C. above Tg of any particular polycycloolefin polymer or above the Tg of the blend. Melt processing can be conducted on any conventional mixing apparatus such as a two-roll mill, a Banbury, single screw extruder, twin screw extruder, and the like.

Inasmuch as the Tg of the various polycycloolefin polymers varies over a wide range, solution or solvent blends thereof can be utilized to tailor-make a polycycloolefin blend having a desired or specified glass transition temperature. The amounts of the specific components of the blend can be readily determined to form a desired Tg. Since as the various polycycloolefin polymers are generally compatible, amounts from about 1% to about 99% by weight can be utilized with any other number of polycycloolefin polymers. Generally, the blends are made from 2 to 3 different polycycloolefins polymers. A more desired range is from about 5% to about 95% by weight.

Blends of polycycloolefin polymers with the ethylene-based functional polymers have improved properties including those of processability, that is ease of processing at the same or slightly lower temperatures, improved solvent resistance, improved impact strength, and improved thermal aging resistance.

Environmental thermal stability properties are especially improved, that is, retention of properties upon aging such as impact strength, melt viscosity, and the like. A drawback of the various heretofore homo-, or interpolymers of polycycloolefins is that they tend to loose their impact strength upon thermal aging. According to the present invention, this deficiency has been dramatically reduced.

The blends of the present invention can be utilized as engineering plastics such as for computer housing, telephones, housings, cabinets, furniture, etc. and also with regard to electronic chemical applications such as circuit boards, conformal coatings, and the like.

The blends of the present invention can contain various known additives in conventional amounts such as various antioxidants, pigments, polymeric processing aids, and the like. Such additives or agents are commonly utilized with various polycycloolefin polymers, and hence are known to the art as well as to the literature.

The invention will be better understood by reference to the following examples:

EXAMPLES 1-4

The following blends which are based on a terpolymer of MTD/MNB/DCPD were prepared utilizing the amounts set forth in Table I.

TABLE I

| Terpolymer of | EX 1 | EX 2 | EX 3 | EX 4 |
|---|---|---|---|---|
| MTD/MNB/DCPD (45/50/5) | 100 | 100 | 100 | 100 |
| Bynel CXA 1124 | 0 | 20 | 0 | 0 |
| Bynel CXA 3101 | 0 | 0 | 20 | 0 |
| Linear Low Density Polyethylene | 0 | 0 | 0 | 20 |
| Antioxidants | 2 | 2 | 2 | 2 |

a - MTD, methyltetracyclododecene
MNB, methylnorbornene
DCPD, dicyclopentadiene
b - Bynel CXA 1124: a blend of copolymers are made from ethylene and vinyl acetate, and ethylene and acrylic acid, manufactured by DuPont
c - Bynel CXA 3101: a blend of copolymers made from ethylene and and ester, and ethylene and an acid, manufactured by DuPont
d - Union Carbide's GPEP 705: a linear low density polyethylene
e - Antioxidants used: 1 part Irganox 1010 which is 2,2-bis[[3,5-bis(1,1-Dimethylenthyl)-4-hydroxyphenyl]-1-oxopr opoxy]methyl]-1,3-propanediyl 3,5-bis(1,1-dimethyl-ethyl)-4-hydroxybenzenepropanoate available from ciba geigy, and 1 part BHT which is 2,6-di-tert-butyl-4-methylphenol) available from Alrich.

The various compounds of Table I were melt mixed at 200° C. utilizing a 6-inch electric mill. All ingredients and additives were mixed simultaneously. The milled blends were then compression molded at 200° C. and tested with regard to various thermal aging physical properties. The results are set forth in Table II.

TABLE II

| | EX 1 | EX 2 | EX 3 | EX 4 |
|---|---|---|---|---|
| Heat Distortion Temperature (°C.) ASTM 684, 264 psi | | | | |
| as molded | 86 | 83 | 81 | 8' |
| annealed 80° C. × 158 hrs. | 99 | 95 | 92 | 98 |
| Notched Izod Impact Strength ASTM-D256 (ft-lb/in) | | | | |
| as molded | 0.3 | 8.4 | 9.9 | 1.0 |
| aging 80° C. × 66 hrs. | 0.4 | 2.9 | 3.8 | 0.3 |
| 80° C. × 158 hrs. | 0.3 | 2.9 | 4.8 | 0.3 |

EXAMPLES 5-7

The following blends which are based on a copolymer of MTD/MNB, were prepared utilizing the amounts set forth in Table III.

TABLE III

| Copolymer of | EX 5 | EX 6 | EX 7 |
|---|---|---|---|
| MTD/MNB (50/50) | 100 | 100 | 100 |
| Bynel CXA 3101 | 0 | 20 | 0 |
| Linear Low Density Polyethylene | 0 | 0 | 20 |
| Antioxidants, | 2 | 2 | 2 |

TABLE III-continued

| Copolymer of | EX 5 | EX 6 | EX 7 |
|---|---|---|---|
| 1 part Irganox, 1 part BHT | | | |

The various compounds of Table III were melt-mixed at 180° C. also utilizing a 6-inch electric mill. All ingredients and aditives were mixed simultaneously. The milled blends were then compression molded at 180° C. and tested with regard to various thermal aging physical properties. The results are set forth in Table IV.

TABLE IV

| | EX 5 | EX 6 | EX 7 |
|---|---|---|---|
| Heat Distortion Temperature (°C.) ASTM 684, 264 psi | | | |
| as molded | 57 | 54 | 55 |
| annealed 80° C. × 66 hrs. | 57 | 54 | 55 |
| Notched Izod Impact Strength (ASTM D256) (ft.lb/in) | | | |
| as molded | 0.5 | 4.8 | 0.7 |
| aging 80° C. × 66 hrs | 0.5 | 4.7 | 0.7 |

The notched Izod impact strength was tested at room temperature. As apparent from the data, blends of copolymers and terpolymers of present invention containing an ethylene-based functional polymer, that is Examples 2, 3, and 6 had significantly improved notched Izod impact properties, not only as molded, but also when heat aged over a period of days. In contrast, the control, that is Examples 1 and 5 which did not contain an ethylene based functional polymer, had very poor impact properties. Similarly, a blend of the co- or terpolymer with linear low density polyethylene, that is Examples 4 and 7 did not exhibit any significant improved physical properties upon molding, or any good properties retention upon aging. Accordingly, unexpected improvements in physical properties as well as thermal aging thereof has been shown. Similar results were obtained with regard to heat distortion temperatures.

The blends of Examples 3 and 6 were tested with regard to solvent resistance by immersing the same in tetrahydrofuran. After two days, the blend remained intact and in one piece. This implies that severe environmental solvent stress cracking and crazing of the blends of the present invention are minimized. In contrast thereto, the control, that is Examples 1 and 5, exhibited volume swelling.

Moreover, blends of the terpolymer of the present invention, that is Examples 2 and 3, exhibited lower melt viscosity than that of the control (Example 1). Furthermore, blends of the present invention, that is Examples 2 and 3, exhibited better retention of shear viscosity as compared with the control (Example 1) upon thermal aging.

Similar results were also obtained for the present invention using a copolymer. That is, Example 6 also exhibited lower viscosity than that of the control, Example 5.

While in accordance with the Patent Statutes, the preferred embodiment and best mode have been set forth, the scope of the invention is not limited thereto, but rather by the scope of the attached claims.

What is claimed is:

1. A melt blend of a polycycloolefin polymer, comprising;

at least one plastic polycycloolefin polymer melt blended with an ethylene-based functional polymer at a temperature above the Tg temperature of said polycycloolefin polymer, said polycycloolefin polymer being selected from the group consisting of (a) a homopolymer made from a polycycloolefin monomer, (b) an interpolymer made from two or more polycycloolefin monomers, and (c) an interpolymer made from one or more polycycloolefin monomers with one or more monocycloolefin monomers, said monomers having from 1 to 4 double bonds therein, the amount of said ethylene-based functional polymer being from about 1.0% to about 45% by weight based upon the total weight of said ethylene-based functional polymer and said at least one polycycloolefin polymer, wherein said ethylene-based functional polymer is a blend of an ethylene-vinyl ester copolymer and at least one copolymer of ethylene with a functional vinyl monomer, wherein the amount of said ethylene-vinyl ester copolymer is from about 50% to about 99% by weight based upon the total weight of said ethylene-vinyl ester copolymer and said copolymer of ethylene with a functional vinyl monomer, wherein the amount of said copolymer of ethylene with a functional vinyl monomer being from about 1% up to about 50% by weight, wherein said ester portion of said ethylene-vinyl ester copolymer contains a total of from 1 to 10 carbon atoms, wherein the weight of said vinyl ester portion of said ethylene-vinyl ester copolymer is from about 5% to about 50% by weight, and wherein said functional vinyl portion of said copolymer of ethylene with a functional vinyl monomer contains a vinyl organic acid or a vinyl organic anhydride having from 3 to 12 carbon atoms.

2. A melt blend of a polycycloolefin polymer according to claim 1, wherein the amount of said ethylene-based functional copolymer is from about 12% to about 35% by weight, and wherein said glass transition temperature of said polycycloolefin polymer is from about 0° C. to about 250° C., wherein said one or more monocycloolefin monomers is a monocyclo monoolefin or monocyclo diolefin having from 4 to 12 carbon atoms and wherein said polycycloolefin monomer or said two or more polycycloolefin monomers independently has from 2 to 10 rings and from 7 to about 35 carbon atoms.

3. A melt blend of a polycycloolefin polymer according to claim 2, wherein said monocyclo monoolefin or monocyclo diolefin contains from about 4 to about 9 carbon atoms, wherein said polycycloolefin monomer or said two or more polycycloolefin monomers independently contains from about 7 to about 13 carbon atoms with from 2 to 4 rings and 1 or 2 double bonds, wherein said vinyl ester of said ethylene-vinyl ester copolymer is vinyl acetate, wherein the amount of said vinyl acetate in said ethylene-vinyl acetate copolymer is from about 10% to about 35% by weight, wherein said functional vinyl containing portion of said copolymer of ethylene with a functional vinyl monomer is methacrylic acid, and wherein the amount of said methacrylic acid in said ethylene-methacrylic acid copolymer is from about 1% to about 25% by weight.

4. A melt blend of a polycycloolefin polymer according to claim 3, wherein the amount of said ethylene-based functional copolymer is from about 15% to about 25% by weight, wherein said monocycloolefin is selected from the group consisting of cyclopentene, cyclooctene, and 1,5-cyclooctadiene, and wherein said polycycloolefin monomer or said two or more polycycloolefin monomers independently is selected from the group consisting of dicyclopentadiene norbornene, methylnorbornene, ethylnorbornene, propylnorbornene, phenylnorbornene, and cyclohexenylnorbornene.

5. A melt blend of a polycycloolefin polymer according to claim 4, wherein said polycycloolefin polymer is a copolymer made from monomers selected from the group consisting of norbornene, and methylnorbornene with monomers selected from the group consisting of methyltetracyclododecene, tetracyclododecene, and dicyclopentadiene, or a terpolymer made from monomers selected from the group consisting of dicyclopentadiene, methylnorbornene, and methyltetracyclododecene; methylnorbornene, norbornene, and methyltetracyclododecene; or methylnorbornene, ethylidenenorbornene, and methyltetracyclododecene.

6. A melt blend of a polycycloolefin polymer according to claim 2, wherein at least one of said one or more monocycloolefin monomers is a norbornene monomer having the formula

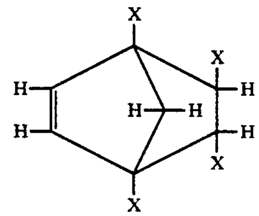

wherein X is hydrogen or an alkyl group having from 1 to 6 carbon atoms.

7. A process for preparing a melt blended polycycloolefin polymer, comprising the steps of:

adding one or more plastic polycycloolefin polymers made from monomers having from 1 to 4 double bonds therein to a mixer, adding an ethylene-based functional polymer to said mixer, and heating and blending said polycycloolefin polymer and said ethylene-based functional polymer at a temperature at least 5° C. above the glass transition point of said polycycloolefin polymer to form a melt blended polycycloolefin, wherein the amount of said ethylene-based functional polymer is from about 1.0% to about 45% by weight based upon the total weight of said ethylene-based functional polymer and said one or more polycycloolefin polymers, and wherein said glass transition temperature of said polycycloolefin polymer is from about 0° C. to about 250° C., said ethylene-based functional polymer being a blend of an ethylene-vinyl ester copolymer and at least one copolymer of ethylene with a functional vinyl monomer, the amount of said ethyelene-vinyl ester copolymer being from about 50% to about 99% by weight based upon the total weight of said ethylene-vinyl ester copolymer and said copolymer of ethylene with a functional vinyl monomer, the amount of said copolymer of ethylene with a functional vinyl monomer being from about 1% up to about 50% by weight, wherein said ester portion of said ethylene-vinyl ester copolymer contains a total of from 1 to 10 carbon atoms, the weight of said vinyl ester portion of said ethylene-vinyl ester copolymer being from about 5% to about 50% by weight, and said functional vinyl portion of said copolymer of ethylene with a functional vinyl monomer containing a vinyl organic acid or an organic anhydride having from 3 to 12 carbon atoms.

8. A process according to claim 7, wherein said polycycloolefin polymer is selected from the group consisting of a) a homopolymer made from a polycycloolefin monomer, (b) an interpolymer made from 2 or more polycycloolefin monomers, and (c) an interpolymer made from one or more polycycloolefin monomers with one or more monocycloolefin monomers, wherein said one or more monocycloolefin monomers is a monocyclo monoolefin or a monocyclo diolefin having from 4 to 12 carbon atoms, and wherein said polycycloolefin or said two or more polycycloolefin monomers independently has from 2 to 10 rings with from 7 to about 35 carbon atoms.

9. A process according to claim 8, wherein the amount of said ethylene-based functional copolymer is from about 12% to about 35% by weight, wherein said glass transition temperature of said polycycloolefin polymer or is from about 45° C. to about 180° C.

10. A process according to claim 9, including mixing said polycycloolefin polymer with said ethylene-based functional copolymer at a temperature of at least 20° C. above the glass transition temperature of said polycycloolefin polymer, wherein said monocyclo monoolefin or monocyclo diolefin contains from about 4 to about 9 carbon atoms, wherein said polycycloolefin monomer or said two or more polycycloolefin monomers independently contains from about 7 to about 13 carbon atoms with from 2 to 4 rings and 1 or 2 double bonds, wherein said vinyl ester of said ethylene-vinyl ester copolymer is vinyl acetate, wherein the amount of said vinyl acetate in said ethylene-vinyl acetate copolymer is from about 10% to about 35% by weight, wherein said functional vinyl containing portion of said copolymer of ethylene with a functional vinyl monomer is methacrylic acid, and wherein the amount of said methacrylic acid in said ethylene-methacrylic acid copolymer is from about 1% to about 25% by weight.

11. A process according to claim 10, wherein the amount of said ethylene-based functional copolymer is from about 15% to about 25% by weight, wherein said glass transition temperature of said polycycloolefin polymer is from about 75° C. to about 160° C.

12. A process according to claim 7, wherein the amount of said ethylene-based functional copolymer is from about 15% to about 25% by weight, wherein said vinyl ester of said ethylene-vinyl ester copolymer is vinyl acetate, wherein the amount of said vinyl acetate in said ethylene-vinyl acetate copolymer is from about 10% to about 35% by weight, wherein said functional vinyl containing portion of said copolymer of ethylene with a functional vinyl monomer is methacrylic acid, wherein the amount of said methacrylic acid in said ethylene-methacrylic acid copolymer is from 1% to about 25% by weight, and wherein said monocyclo olefin is selected from the group consisting of cyclopentene, cyclooctene, and 1,5-cyclooctadiene, and wherein said polycycloolefin monomer or said two or more polycycloolefin monomers independently is selected from the group consisting of dicyclopentadiene norbornene, methylnorbornene, ethylnorbornene, propylnorbornene, phenylnorbornene, and cyclohexenylnorbornene.

13. A process according to claim 12, wherein said polycycloolefin polymer is a copolymer made from monomers selected from the group consisting of norbornene and methylnorbornene with monomers selected from the group of methyltetracyclododecene, tetracyclododecene, and dicyclopentadiene, or a terpolymer made from monomers selected from the group consisting of dicyclopentadiene, methylnorbornene, and methyltetracyclododecene; methylnorbornene, norbornene, and methyltetracyclododecene; or methylnorbornene, ethylidenenorbornene, and methyltetracyclododecene.

* * * * *